US012768145B2

(12) United States Patent
Wani et al.

(10) Patent No.: US 12,768,145 B2

(45) Date of Patent: Oct. 20, 2026

(54) SYSTEM AND METHOD FOR AUTOMATING TRAVEL READY AND WORK READY SEQUENCES FOR A WORK MACHINE

(71) Applicant: Deere & Company, Moline, IL (US)

(72) Inventors: Laxmikant Wani, Pune (IN); Suraj D. Jadhav, Pune (IN); Sourabhsingh Yuvarajsingh Rajput, Pune (IN)

(73) Assignee: Deere & Company, Moline, IL (US)

( * ) Notice: Subject to any disclaimer, the term of this patent is extended or adjusted under 35 U.S.C. 154(b) by 23 days.

(21) Appl. No.: 19/085,068

(22) Filed: Mar. 20, 2025

(65) Prior Publication Data

US 2026/0286655 A1 Sep. 24, 2026

(51) Int. Cl.

*E02F 9/24* (2006.01)
*E02F 9/26* (2006.01)
*G06V 10/80* (2022.01)

(52) U.S. Cl.

CPC ................ *E02F 9/24* (2013.01); *E02F 9/262* (2013.01); *E02F 9/265* (2013.01); *G06V 10/80* (2022.01)

(58) Field of Classification Search

CPC .. E02F 9/24; E02F 9/262; E02F 9/265; G06V 10/80

See application file for complete search history.

(56) References Cited

U.S. PATENT DOCUMENTS 7,753,132 B2 7/2010 Stanek et al.
2021/0222405 A1 7/2021 Velde et al.

*Primary Examiner* — Ashley L Redhead, Jr.

(74) *Attorney, Agent, or Firm* — Gary L. Montle; S. Chase Talbot; Patterson Intellectual Property Law, PC

(57) ABSTRACT

A system and method for automating the transition of a work machine between a travel mode and a work mode are disclosed. The system includes a work implement controllably movable relative to a frame, stabilizers, and a plurality of perception sensors capturing data from ground surfaces and movement trajectories. A controller processes sensor data to determine surface evenness and obstacle states, selectively enabling or preventing transitions based on predefined safety thresholds. In transitioning to work mode, the system assesses terrain stability and stabilizes the machine accordingly. In transitioning to travel mode, the system detects obstacles and generates safe movement trajectories to secure the work implement and stabilizers. The system further provides alerts and may override operator commands if safety conditions are not met. The invention enhances operational efficiency, reduces operator workload, and improves safety by minimizing errors in machine stabilization and movement.

20 Claims, 4 Drawing Sheets

SYSTEM AND METHOD FOR AUTOMATING TRAVEL READY AND WORK READY SEQUENCES FOR A WORK MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE DISCLOSURE

The present disclosure relates generally to work machines in, e.g., the construction and/or agricultural industries, and more particularly, the present disclosure relates to systems and methods for control of certain movements and/or operations of stabilization of a work machine based on, e.g., underlying terrain.

BACKGROUND

Work machines, such as a backhoe loader, are essential machines in construction and excavation, commonly used for tasks like digging, trenching, and earthmoving. While various examples of a work machine as discussed herein may relate to self-propelled vehicles, additional examples of work machines such as for example towed machines or machines which are otherwise transported from a first location to a second location may be contemplated within the scope of the present disclosure.

For effective and safe operation, the work machine must often be stabilized before work, typically involving the operator lowering the stabilizers and front loader bucket to establish a three-point ground contact, followed by releasing the boom lock to enter a work-ready state. Similarly, for transport or repositioning, the machine must often be reconfigured into a travel-ready state, which in the exemplary case of the backhoe loader may require raising the stabilizers and front loader bucket, retracting the boom, and securing the boom lock.

The preparation and transition process between work-ready and travel-ready states is often repetitive, labor-intensive, and can lead to operator fatigue over time. Manual execution of these tasks also introduces the risk of errors, such as operating on uneven surfaces or failing to properly secure the boom lock. Such mistakes may compromise machine stability, reduce operational efficiency, and pose safety hazards.

There is an ongoing need in the field of such work machines to reduce the repetitive and labor-intensive tasks. Reducing the need for manual adjustments and monitoring, especially over prolonged periods, may decrease the physical and mental strain on operators. A reduction in operator fatigue may enhance reaction times and reduce the likelihood that steps will be missed or performed inadequately.

BRIEF SUMMARY OF THE DISCLOSURE

The current disclosure provides an enhancement to conventional systems and methods, at least in part by automating preparation for each of a travel mode and a work mode for a work machine comprising a work implement, wherein the work implement is controllably movable relative to a frame of the work machine in association with at least the work mode, and a plurality of stabilization points are defined relative to the frame in association with at least the work mode.

In an embodiment, a method comprises responding to the initiation of a first transition from a current travel mode to a desired work mode. Responding to the initiation of a first transition further comprising, capturing data sets from each of a plurality of perception sensors associated with the work machine and having respective fields of view including a ground surface traversed by the work machine, wherein a plurality of data sets are captured for each of respective ground surface areas corresponding to the plurality of stabilization points, fusing the plurality of data sets for each respective ground surface area in a common reference system, determining, from the fused data sets, a relative evenness of the respective ground surface areas, and selectively enabling or preventing initiation of the desired work mode based on the determined relative evenness of the respective ground surface areas.

In alternative embodiments, the method comprises responding to the initiation of a second transition from a current work mode to a desired travel mode. Responding to the initiation of a second transition further comprising, capturing data sets from each of a plurality of perception sensors associated with the work machine and having respective fields of view corresponding to available ranges of movement for each of one or more available movement trajectories of the work implement, wherein a plurality of data sets are captured for each of the one or more available ranges of movement, fusing the plurality of data sets for each respective available range of movement in a common reference system, determining, from the fused data sets, an obstacle state for each of the one or more available ranges of movement, each obstacle state at least corresponding to an expected movement trajectory of the work implement to arrive at a travel position, and selectively enabling or preventing movement of the work implement to the travel position based on the determined one or more obstacle states.

In one exemplary aspect of the above-referenced embodiments, the first transition may alert an operator when the determined relative evenness of the respective ground surface areas is below a predetermined threshold.

In another exemplary aspect of the above-referenced embodiments, the second transition may alert an operator when an obstacle is determined within the expected movement trajectory of the work implement.

The second transition may still further comprise centering the work implement relative to the work machine by moving the work implement along the automated trajectory plan by controlling one or more actuators to adjust one or more hydraulic swing cylinders, hydraulic lift cylinders, hydraulic crowd cylinders, or hydraulic tilt cylinders.

In one exemplary aspect of the above-referenced embodiments, the plurality of stabilization points includes at least one work implement, a right-side stabilizer, and a left-side stabilizer.

In another exemplary aspect of the above-referenced embodiment, the method, in association with selectively enabling initiation of the desired work mode based on the determined relative evenness of the respective ground surface areas, may lower the plurality of stabilization points to create three points of contact with the respective ground surface areas.

In one exemplary aspect of the above-referenced embodiments, the plurality of perception sensors includes at least one of LiDAR sensors, cameras, ultrasonic sensors, or structured light sensors.

In another exemplary aspect of the above-referenced embodiments, the fields of view of the plurality of perception sensors are dynamically adjusted based on detected changes in orientation and/or operating conditions of the work machine.

In one exemplary aspect of the above-referenced embodiments, preventing initiation or preventing movement includes overriding operator commands if the determined stability or obstacle state does not meet predefined safety thresholds.

In an embodiment, a system for transitioning between a travel mode and a work mode for a work machine, the work machine comprising a frame and a work implement controllably movable relative to the frame. Stabilizers are operable to contact a ground surface. A plurality of sensors are configured to capture data from respective fields of view, and a storage medium is configured to store predefined thresholds and trajectory data. A controller is operatively coupled to the plurality of sensors, and the controller is configured to fuse the captured data into a common reference frame to generate a surface profile of ground surface areas, and obstacle data within movement trajectories. The controller determines whether the surface profile meets a predefined stability threshold for the work mode and safe movement trajectories for transitioning the work implement and stabilizers to predefined travel positions. The controller also automatically controls the movement of the work implement and stabilizers to deploy and stabilize the machine for the work mode when the stability threshold is met and retract the work implement and stabilizers to predefined travel positions for the travel mode along the determined safe trajectories.

In one exemplary aspect of the above-referenced embodiment, the fields of view include ground surface areas corresponding to stabilizer contact points and movement trajectories of the work implement and stabilizers.

In another exemplary aspect of the above-referenced embodiment, the stabilizers include at least one work implement, a right-side stabilizer, and a left-side stabilizer.

In one exemplary aspect of the above-referenced embodiment, a user interface is configured to receive input transition requests and provide notifications, wherein the notifications relate to stability conditions, obstacle presence, or transition status. (safety condition)

In another exemplary aspect of the above-referenced embodiment, the plurality of sensors comprises at least one LiDAR, cameras, ultrasonic sensors, or structure light sensors for detecting surface profiles and obstacles.

In one exemplary aspect of the above-referenced embodiment, the controller is configured to execute obstacle avoidance maneuvers by adjusting the movement trajectory of the work implement based on real-time obstacle detection.

In another exemplary aspect of the above-referenced embodiment, the predefined travel positions for the work implement, and stabilizers are adjustable based on operator preferences or site-specific conditions entered via the user interface.

In one exemplary aspect of the above-referenced embodiment, the plurality of sensors includes tilt sensors to measure the pitch and roll of the work machine and provide input for stabilizing the work machine on uneven terrain.

In another exemplary aspect of the above-referenced embodiment, a safety module is configured to override operator commands if the controller determines a safety threshold is exceeding during transitioning between a travel mode and a work mode.

Unless otherwise defined, all technical and scientific terms used herein have the same meaning as commonly understood by one of ordinary skill in the art to which this invention belongs. The present invention may be embodied in other specific forms without departing from the spirit or essential attributes thereof, and it is therefore desired that the present embodiment be considered in all aspects as illustrative and not restrictive. Any headings utilized in the description are for convenience only, and have no legal or limiting effect.

BRIEF DESCRIPTION OF THE DRAWINGS

Numerous objects, features and advantages of the embodiments set forth herein will be readily apparent to those skilled in the art upon reading of the following disclosure when taken in conjunction with the accompanying drawings.

DETAILED DESCRIPTION

Reference will now be made in detail to embodiments of the present disclosure, one or more drawings of which are set forth herein. Each drawing is provided by way of an explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

As previously noted, systems and methods as disclosed herein enable work-ready and travel-ready optimization of a work machine. Accordingly, for a work machine engaging a work machine state (e.g., travel-ready and/or dig-ready), the systems and methods as disclosed herein may preferably assist in optimizing performance and vehicle usage, and further provide real-time notifications to users.

Figure 1:
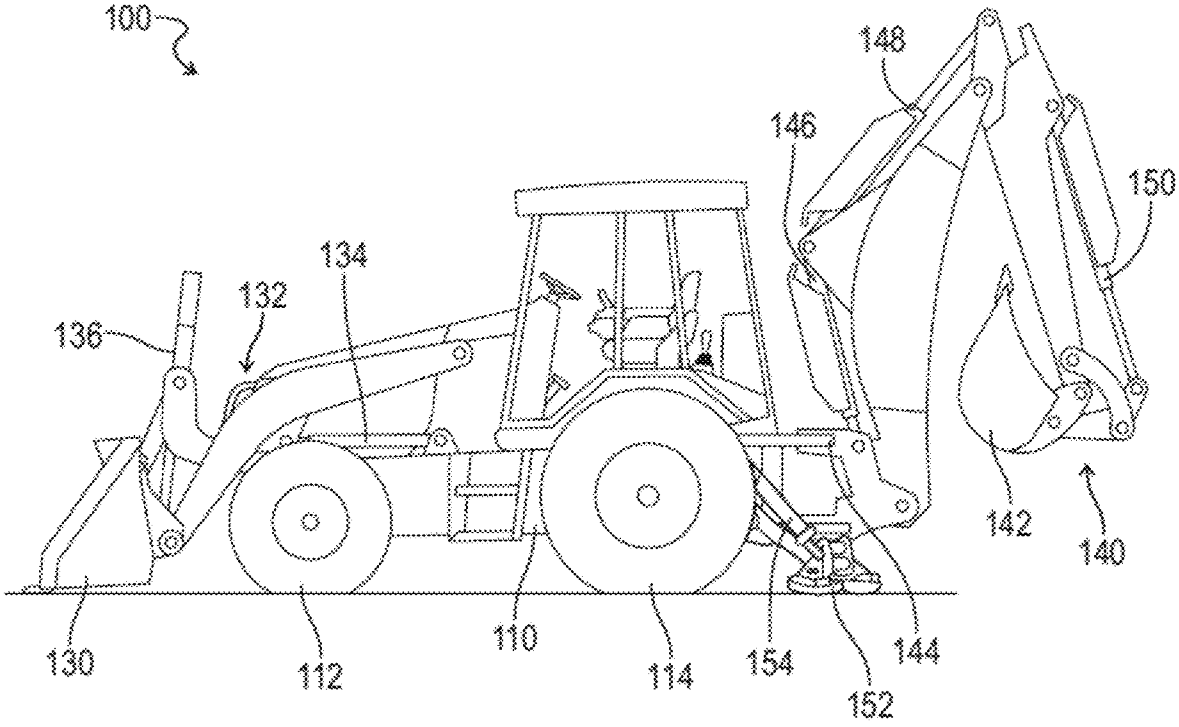
FIG. 1 is a side view representing a wheeled backhoe excavator as an exemplary work machine incorporating an embodiment of a system and method as disclosed herein.

Referring now to the drawings and particularly to FIG. 1, a representative work machine 100 is shown and generally designated by the number 100. In the particular example given, and for illustrative purposes throughout the detailed description herein, FIG. 1 shows a loader backhoe as the work machine. The systems disclosed herein may be applicable to similar or otherwise equivalent agricultural, construction, or other vehicles, including for example excavator machines, loaders, graders, and other working machines of the type typically having one or more work implements for modifying the proximate terrain. In certain embodiments, systems and methods as disclosed herein may also be applicable to vehicles lacking explicit work implements.

Work machines 100 as discussed herein may typically have tracked or wheeled traveling devices supporting the undercarriage from the ground surface. The backhoe in FIG. 1 is illustrated with front wheels 112 and rear wheels 114 as the traveling devices. The traveling devices may be implemented within the scope of the present disclosure in alternative embodiments as, e.g., belts, steel tracks, or the like. The work machine 100 includes an operator cab supported by a main frame 110 to house and protect the operator of vehicle. The operator cab and the one or more work implements 130, 142 may be mounted on the main frame so that the operator cab faces in the working direction of the work implements. The operator cab may take numerous conventional forms, including for example one or more user interface devices (not shown) such as a display unit, foot pedals, a steering wheel, joysticks, buttons, and any other controls or indicators necessary to operate the vehicle.

As previously noted, the work machine 100 may include one or more work implements, which in the illustrated embodiment of FIG. 1 are a front-mounted bucket 130 (i.e., a loader) and a rear-mounted bucket 142 (i.e., a backhoe). In alternative embodiments the work implements may include only one of the aforementioned implements, or, e.g., shovels, blades, tillers, mowers, and the like. Buckets 130, 142 are moveably coupled to the main frame 110 for working the terrain, e.g., scooping, carrying, and dumping dirt and other materials. The front-mounted bucket 130 may be moveably coupled to a front end of the main frame 110 via a first boom assembly 132, including a plurality of hydraulic actuators for moving the front-mounted bucket relative to the main frame. The first boom assembly may include hydraulic lift cylinders 134 for raising and lowering the first boom assembly and a hydraulic tilt cylinder 136 for tilting (e.g. digging and dumping) the front-mounted bucket. The rear-mounted bucket 142 may be moveably coupled to a rear end of the main frame via a second boom assembly 140, including a plurality of hydraulic actuators for moving the rear-mounted bucket relative to the main frame. The second boom assembly may include, e.g., a plurality of hydraulic swing cylinders 144 for swinging the second boom assembly from side to side, a hydraulic lift cylinder 146 for raising and lowering the second boom assembly, a hydraulic crowd cylinder 148 for bending the second boom assembly, and a hydraulic tilt cylinder 150 for tilting (e.g. digging and dumping) the rear-mounted bucket. The operator may selectively control movement of the buckets 130, 142 using controls located within the operator cab, such as one or more of the above-referenced user interface devices.

The exemplary work machine 100 as shown in FIG. 1 may still further include right-side and left-side stabilizers 152 for supporting and stabilizing the work machine on the ground, especially in modes wherein one or more of the buckets 130, 142 are in operation. Hydraulic lift cylinders 154 may be implemented for raising and lowering the stabilizers 152 relative to the main frame 110 of the work machine.

Figure 2:
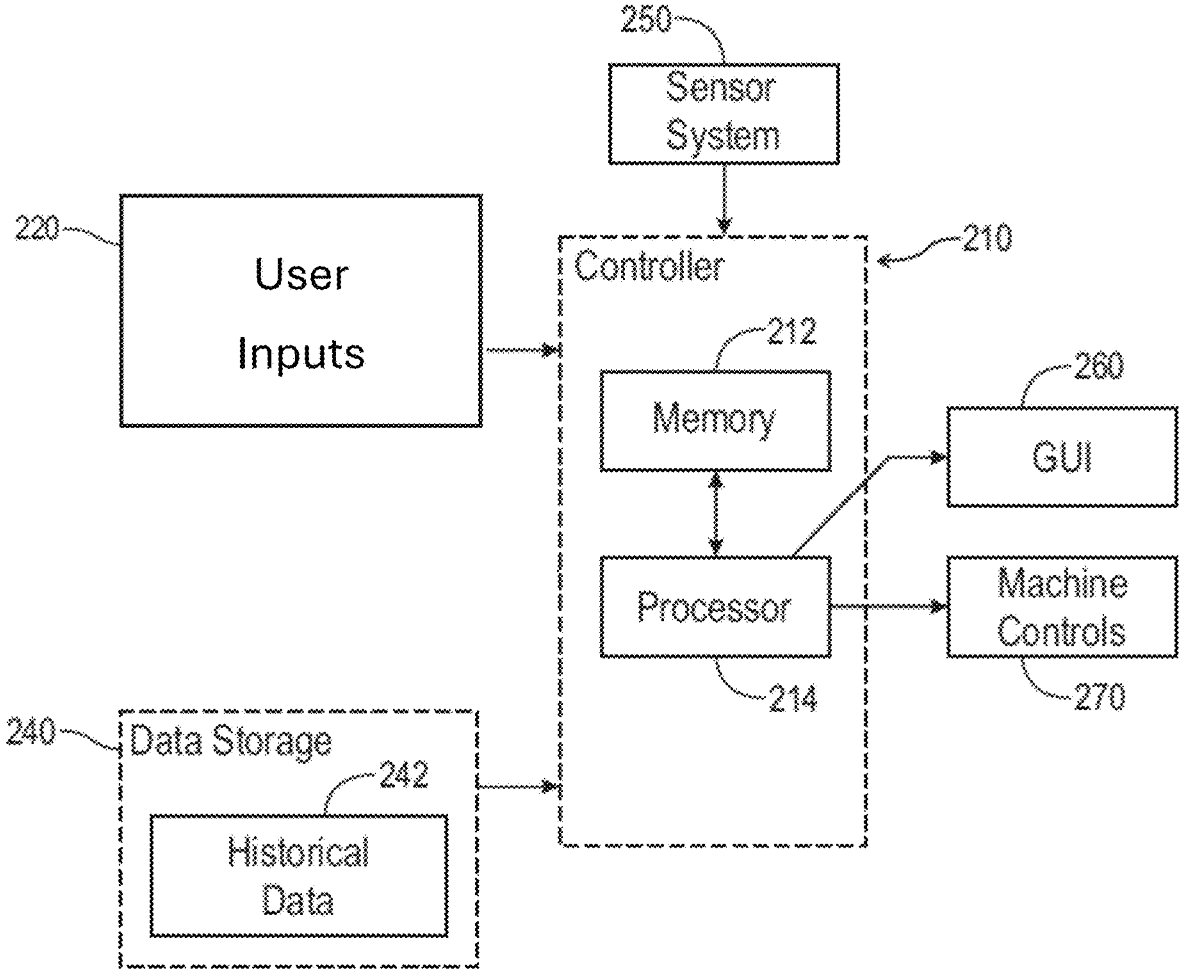
FIG. 2 is a block diagram representing an exemplary control system for the work machine of FIG. 1.

As schematically illustrated in FIG. 2, the work machine 100 includes a control system including a controller 210. The controller may be part of a central control system of the work machine, or it may be a separate control module. The controller may include one or more user interface devices as referenced above, and may optionally be mounted in the operator cab at a control panel.

The controller 210 is configured to receive input signals from some or all of the various sensors collectively defining a sensor system 250. Certain of these sensors may be provided to detect machine operating conditions or positioning, including for example an orientation sensor, vehicle speed sensors, vehicle implement positioning sensors, and the like, and whereas one or more of these sensors may be discrete in nature the sensor system may further refer to signals provided from the machine control system. Some sensors may be received as feedback signals from respective sources in the sensor system 250, such as for example from a kinematic detection system configured to monitor the current positions and/or operations of the element(s) (e.g., front-mounted bucket 130, first boom assembly 132, second boom assembly 140, rear-mounted bucket 142, and/or right-side and left-side stabilizers 152) in respective coordinate space, such as for example in an independent coordinate frame respective to a local navigation frame of the work machine 100. An exemplary kinematic system may include inertial measurement units (IMUs) mounted or affixed to elements of the boom assembly and/or main frame of the work machine 100, and which further include a number of sensors, including, but not limited to: accelerometers, which measure (among other things) velocity and acceleration, gyroscopes, which measure (among other things) angular velocity and angular acceleration, and/or magnetometers, which measure (among other things) strength and direction of a magnetic field.

Other sensors in the sensor system 250 may be provided to detect ambient conditions including for example obstacles in the path and/or vicinity of the work machine, and may include LiDAR, laser scanners, thermal sensors, imaging devices, structured light sensors, ultrasonic sensors, and other optical sensors. The types and combinations of obstacle sensors may vary for a type of working machine, work area, and/or application, but generally are provided and configured to optimize recognition of obstacles in a working path of the vehicle.

Still another example of features enabled by sensor system 250 inputs and associated controller 210 programming may include a tip-over (or equivalent) warning feature, indicating when the work machine 100 is approaching an unsafe position or orientation, and in some embodiments indicating recommended mitigation actions, e.g., where to position the front-mounted bucket 130 under the detected circumstances. In such an example, the work machine 100 may be configured to monitor slope and calculate the ideal pose, and the work machine 100 may automatically act or put bounds on that pose and slope and generate a warning output to the operator when those bounds are exceeded, and/or indicate to the operator a suggested action.

One or more work machine 100 control and/or control inputs may be received as feedback regarding commands from respective sources in the sensor system 250, and further processed along with the implement sensor inputs. In such embodiments control operations may accordingly be executed responsive to one or more of a determined (e.g., selected) travel mode, work machine state, feedback signals corresponding to respective current positions and/or operations of the work implements (e.g., front-mounted bucket 130, first boom assembly 132, second boom assembly, 140, and/or rear-mounted bucket 142) and the feedback signals corresponding to user inputs 220.

Such processing, which may be carried out by controller 210, may further include stored target values for each of one or more elements of the work machine 100 (e.g., work implements, boom assembly, vehicle state) in accordance with the selected or determined travel mode. The stored target values may be retrievable by the controller 210 from associated data storage 240 in view of a determined work machine state, and further may comprise for example respective predetermined target positions and/or operations of each relevant work implement or element thereof (e.g., relative positions and/or movements of the front-mounted bucket 130, first boom assembly 132, second boom assembly 140, rear0mounted bucket 142, right-side and left-side stabilizers, etc.).

Control signals may then be generated regarding one or more parameters or operations (or sequences of parameters or operations) for automation in conjunction with the selected or determined travel mode or work machine state. The control signals, and the relevant control systems for which automation is selectively utilized, may be dependent on any or all of various conditions including for example a determined travel mode, work machine state, a grade/slope off the terrain, an angle at which the work machine is positioned, a load carried by the work machine, a condition of the ground surface, etc.

The controller 210 as shown is further configured to receive input data regarding specified procedures to be performed by the work machine in a given period of time, for example in the form of user input signals 220 via one or more of the aforementioned user interface devices. As further detailed below, the operator may provide the controller with information in the form of alphanumeric text, selectable codes, and the like.

The controller 210 as shown is further configured to receive historical data 242 from data storage 240. Data storage as discussed herein may, unless otherwise stated, generally encompass hardware such as volatile or non-volatile storage devices, drives, memory, or other storage media, as well as one or more databases residing thereon. The historical data may correspond to one or more specified activities, destinations, and any other metrics or parameters as implemented by the controller for determining or predicting any variables related to the present function. The data storage may be external to the controller, and even to the work machine itself, wherein the historical data may for example be uploaded to the controller on demand. Alternatively, the data storage may be internal to the controller if the controller is configured accordingly.

The controller 210 may be configured to produce output data within the scope of the present disclosure, as further described below, to a graphical user interface 260 for display to the human operator. Such output data may comprise real-time feedback relating to vehicle operation and/or performance. The graphical user interface may in certain embodiments itself be configured to provide the user inputs 220 to the controller. The controller may also be configured to generate control signals 270 for controlling the operation of respective actuators, or signals for indirect control via intermediate control units, associated with a machine steering control system, a machine implement control system, and/or a machine drive control system (not shown).

The controller 210 includes or may be associated with a memory unit 212 and a processor 214, and in certain embodiments may include a communication unit (not shown). It is understood that the controller described herein may be a single controller having all of the described functionality, or it may include multiple controllers wherein the described functionality is distributed among the multiple controllers.

Various operations, steps or algorithms as described in connection with the controller 210 can be embodied directly in hardware, in a computer program product such as a software module executed by the processor 214, or in a combination of the two. The computer program product can reside in the memory unit 212, such as for example RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 214 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Although not shown, a communication unit may be provided to support or provide communications between the controller 210 and external systems or devices, and/or support or provide communication interface with respect to internal components of the work machine 100. The communications unit may include wireless communication system components (e.g., via cellular modem, WiFi, Bluetooth or the like) and/or may include one or more wired communications terminals such as universal serial bus ports.

Various exemplary work states and corresponding implement positions, operations, and/or sequences of operations may be further described by reference to FIGS. 3 and 4, and further for illustrative purposes with respect to an excavator as shown in FIG. 1 as the work machine 100.

Figure 3:
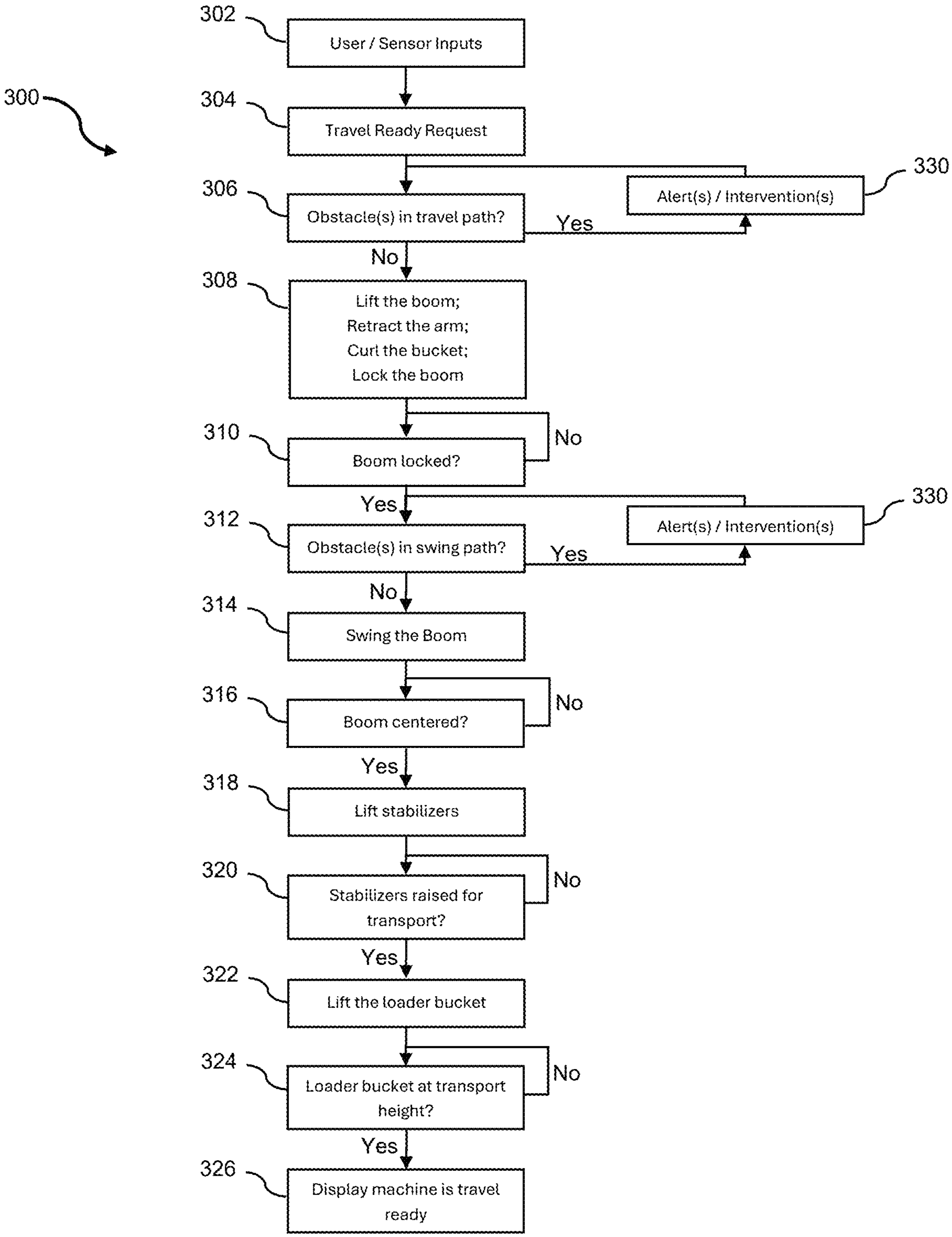
FIG. 3 is a flowchart representing an exemplary embodiment of the travel-ready method as disclosed herein.

Referring generally to FIG. 3, an exemplary method of a travel-ready operation 300 may further be described for engaging the work machine 100. The travel-ready operation 300, as disclosed herein, preferably allows an operator (e.g., the operator physically present in the operator cab during operation) of the work machine 100 to transition to a travel-ready state while reducing the operator's fatigue and repetitive operations.

In one initial step 302, the operator is enabled via user interface devices (e.g., the graphical user interface) of the work machine 100 to provide input data corresponding to one or more operations or an automated output from the sensor system 250 may indicate that a change in work state is required. The user interface devices may typically be located in a control panel of the work machine, but alternatively, the system may incorporate a user interface executable on a computing device associated with the operator, such as, for example, via a mobile computing application or a hosted web page enabling such inputs with respect to a given work machine.

In an embodiment, the operator may initiate a travel-ready request 304. The controller 210, upon receiving the travel-ready request 304, may begin further executing the travel-ready operation 300. Once the controller 210 receives a travel-ready request 304, it is determined whether any obstacles are in the work machine's travel path (306; step three of method 300), via the sensor system 250. In some embodiments it may be understood that respective data sets from a plurality of distinct sensors may be fused in a common reference system. If obstacles are found to be in the work machine's travel path, an alert 330 is prompted. When an obstacle is determined in the work machine's travel path, the controller 210 may cease or postpone any further travel-ready operations 300.

An alert 330 may be visual, such as, for example, on-screen notifications on a work machine's GUI 260, including but not limited to, pop-up messages or flashing indicators. Additionally, an alert 330 may also include auditory alerts, such as, for example, beeps, sirens, or voice prompts to notify the operator. An alert 330 may also be a combination of physical, visual, and/or auditory, such as buzzing.

If no obstacles are detected in the work machine's travel path, the controller 210 may engage in the fourth step of method 300. The fourth step of method 300 (308) may involve the controller 210 lifting the second boom assembly 140, retracting the second boom assembly 140 arm (via the hydraulic lift cylinders 146, the hydraulic crowd cylinder 148, and the hydraulic tilt cylinder 150), curling the rear-mounted bucket 142, and locking the second boom assembly 140.

Upon concluding the preceding steps, the controller 210 may then ensure the second boom assembly 140 is locked (310; fifth step of method 300). If the controller 210 determines that the second boom assembly 140 is not locked, the controller 210 may re-engage in the fourth step of method 300 (308). Additionally, or in the alternative, if the second boom assembly 140 remains unlocked, an alert 330 may be prompted, as described above.

If the second boom assembly 140 is locked, the controller 210, via the sensor system 250, verifies whether any obstacles may be in the swing path of the second boom assembly 140 (312; sixth step of method 300). If any obstacles are detected, an alert 330 is prompted. If no obstacles are detected in the swing path of the second boom assembly 140, the controller will initiate swinging the second boom assembly 140 to be centered with the work machine 100 (314; seventh step of method 300).

The controller 210 may then verify whether the second boom assembly 140 is centered with the work machine 100 (316; eight step of method 300). If the sensor system 250 determines the second boom assembly 140 is not centered with the work machine 100, the controller may re-initiate the seventh step of method 300 (314) and engage swinging the second boom assembly 140 to be centered with the work machine 100. If after re-initiating the seventh step of method 300, the controller determines the second boom assembly 140 is not centered with the work machine 100, an alert 330 may be prompted to the operator.

If the controller determines the second boom assembly 140 has been centered to the work machine 100, the controller may then initiate lifting or retracting the right-side and left-side stabilizers 152 (318; ninth step of method 300). The controller 210 may determine whether the right-side and left-side stabilizers 152 have been raised for transport (320; tenth step of method 300). If the right-side and left-side stabilizers 152 are determined not to have retracted, the controller 210 may re-initiate lifting or retracting the right-side and left-side stabilizers 152 (318; ninth step of method 300). If the right-side and left-side stabilizers are not lifted or retracted, an alert 330 may be prompted to the operator. When it is determined that the right-side and left-side stabilizers have not been retracted, the work machine 100 may cease or postpone any further travel-ready operations 300.

Once the controller 210 has determined that the right-side and left-side stabilizers have been raised for transport 320, the controller may initiate lifting the front-mounted bucket 130 (322; eleventh step of method 300). In raising the front-mounted bucket for transport 320, the controller 210 may lift the front-mounted bucket to a pre-determined height. Alternatively, the lift height may be determined by the operator. The controller 210 may determine whether the front-mounted bucket 130 has been lifted to the pre-determined height or operator selected height (324; thirteenth step of method 300). If it is determined the front-mounted bucket has not been lifted to the designated transport height, the controller may re-initiate lifting the front-mounted bucket 130 (322; eleventh step of method 300). If the controller 210 identifies that the front-mounted bucket has not been lifted to the designated transport height, an alert 330 may be prompted to the operator.

Once the controller 210 has determined the front-mounted bucket has been lifted to a designated transport height, the controller may conclude the travel ready operation 300. Additionally, the controller 210 may alert 330 the operator that the work machine 100 is travel-ready.

Figure 4:
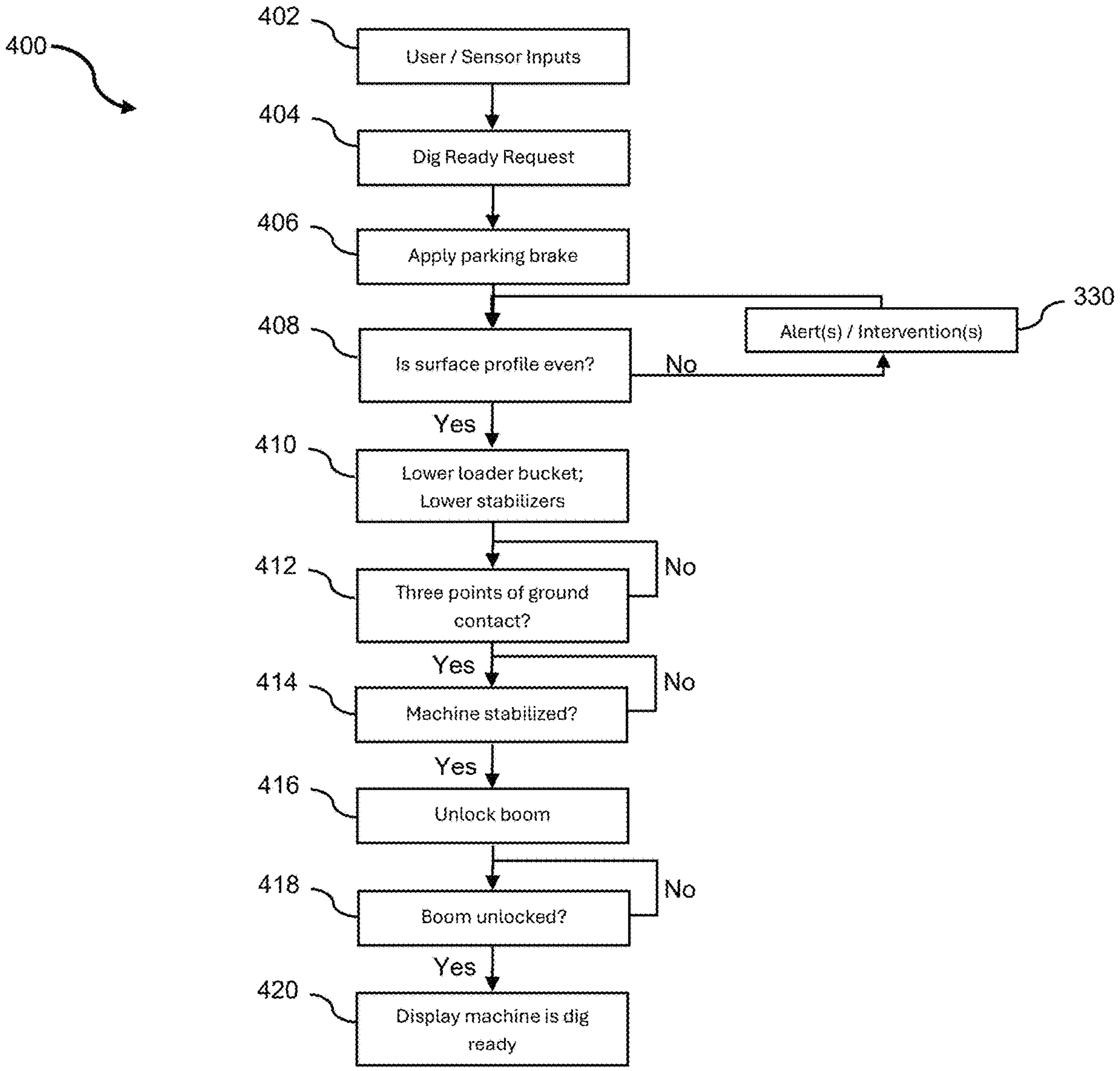
FIG. 4 is a flowchart representing an exemplary embodiment of the dig ready method as disclosed herein.

Referring generally to FIG. 4, an exemplary method of a dig-ready operation 400 may further be described for engaging the work machine 100. The dig-ready operation 400, as disclosed herein, preferably allows an operator (e.g., the operator physically present in the operator cab during operation) of the work machine 100 to transition to a dig-ready state while reducing the operator's fatigue and repetitive operations.

In one initial step 402, the operator is enabled via the user interface device (e.g., the graphical user interface 260) of the work machine 100 to provide input data corresponding to one or more operations. Additionally, or alternatively, the controller 210 may initiate a dig-ready request based on the data received via the sensor systems 250. In an embodiment, the operator may initiate a dig-ready request 402. The controller 210, upon receiving the dig-ready request 302, may begin further executing the dig-ready operation 400. Once the controller 210 receives a dig-ready request 402, the work machine 100 parking brake is engaged (404; third step of method 400).

Once the parking brake is engaged, the controller 210 determines via the sensor system 250, whether the surface profile is even (406; third step of method 400). The sensor system 250, including LiDAR and camera sensors, may be used to determine the surface evenness of the relevant ground surface areas below the work machine, including the surface below the front-mounted bucket 130 and/or the right-side and left-side stabilizers. In various embodiments, it may be understood that respective data sets from a plurality of distinct sensors for each ground surface area may be fused in a common reference system. A surface profile may be determined even when the work machine's pitch and roll are zero. If the surface profile is determined to be uneven, an alert 330 may be prompted to the operator. Additionally, when an uneven surface profile is determined, controller 210 may cease or postpone any further dig-ready operations 400. In the event of an uneven surface profile, the operator may be prompted to reposition the work machine 100. Alternatively, the controller 210 may achieve work machine stabilization on an even surface or uneven surface by adjusting the front-mounted bucket 130 and/or the right-side and left-side stabilizers 152.

Upon determining the surface profile is even, the controller may initiate lowering the front-mounted bucket 130 and lowering or deploying the right-side and left-side stabilizers 152 (410; fifth step of method 400). Lowering the front-mounted bucket 130 and the right-side and left-side stabilizers 152 should be understood as the front-mounted bucket 130 and the right-side and left-side stabilizers 152 making contact with the surface below the work machine 100. It should be understood that when the front-mounted bucket 130 and right-side and left-side stabilizers 152 are lowered and make contact with the surface below the work machine 100, three points of contact will be established.

The controller 210 may then verify that the front-mounted bucket 130 and right-side and left-side stabilizers 152 have been lowered, ensuring that there are three points of contact with the surface below the work machine 100 (412; sixth step of method 400). Three points of contact may be determined based on the position and pressure of the front-mounted bucket 130 and right-side and left-side stabilizers 152. The position and pressure required may be pre-determined or, alternatively, may be selected by the operator. If the controller 210 determines that three points of contract have not been made with the surface below the work machine 100, the controller may re-initiate the fifth step of method 400 in which the front-mounted bucket 130 and right-side and left-side stabilizers 152 are lowered. If three points of contact with the surface below the work machine are not determined, the controller 210 may prompt an alert 330 to the operator. Additionally, when three points of contact are not made, controller 210 may cease or postpone any further dig-ready operations 400.

Once the controller 210 has determined that three points of contact have been made, the controller 210 may unlock the second boom assembly 140 (416; eighth step of method 400). The controller 210 may then determine whether the second boom assembly 140 has been unlocked (418; ninth step of method 400). If the controller 210 determines the second boom assembly 140 remains locked, the controller 210 may re-initiate the eighth step of method 400. If the controller 210 determines the second boom assembly 140 has not unlocked, the controller 210 may prompt an alert 330 to the operator. Additionally, when the second boom assembly 140 is not unlocked, controller 210 may cease or postpone any further dig-ready operations 400.

Once the controller 210 has determined the second boom assembly 140 has been unlocked, the controller may conclude the dig-ready operation 400. Additionally, the controller 210 may alert 330 the operator that the work machine 100 is dig-ready.

In an embodiment, the controller 210 may respond to an alert 330 by performing one or more interventions. For example, the controller 210 may disable one or more components or actions of the work machine 100, pending further manual input from the operator. Alternatively, the controller 210 may implement or recommend a different sequence of operations or modifications to one or more of the specified operations. The controller 210 may be configured to enact interventions for the optimization of one or more specified operations.

Terms such as "a," "an," and "the" are not intended to refer to only a singular entity, but rather include the general class of which a specific example may be used for illustration.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether explicitly described.

As used herein, the phrases "one or more," "at least one," "at least one of," and "one or more of," or variations thereof, when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. The conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Thus, such conditional language is not generally intended to imply that features, elements, and/or states are in any way required for one or more embodiments, whether these features, elements, and/or states are included or are to be performed in any particular embodiment.

Although there have been described particular embodiments of an invention, it is not intended that such references be construed as limitations upon the scope of this invention except as set forth in the following claims.

What is claimed is:

1. A method of automating preparation for each of a travel mode and a work mode for a work machine comprising a work implement, wherein the work implement is controllably movable relative to a frame of the work machine in association with at least the work mode, and a plurality of stabilization points are defined relative to the frame in association with at least the work mode, the method comprising:

responsive to initiation of a first transition from a current travel mode to a desired work mode:

capturing data sets from each of a plurality of perception sensors associated with the work machine and having respective fields of view including a ground surface traversed by the work machine, wherein a plurality of data sets are captured and fused in a common reference system for each of respective ground surface areas corresponding to the plurality of stabilization points;

determining, from the fused data sets, a relative evenness of the respective ground surface areas; and selectively enabling or preventing initiation of the desired work mode based on the determined relative evenness of the respective ground surface areas;

responsive to initiation of a second transition from a current work mode to a desired travel mode:

capturing data sets from each of a plurality of perception sensors associated with the work machine and having respective fields of view corresponding to available ranges of movement for each of one or more available movement trajectories of the work implement, wherein a plurality of data sets are captured and fused in a common reference system for each of the one or more available ranges of movement;

determining, from the fused data sets, an obstacle state for each of the one or more available ranges of movement, each obstacle state at least corresponding to an expected movement trajectory of the work implement to arrive at a travel position; and selectively enabling or preventing movement of the work implement to the travel position based on the determined one or more obstacle states.

2. The method of claim 1, wherein the first transition further comprises:

alerting an operator when the determined relative evenness of the respective ground surface areas is below a predetermined threshold.

3. The method of claim 1, wherein the second transition further comprises:

alerting an operator when an obstacle is determined within the expected movement trajectory of the work implement.

4. The method of claim 1, wherein the second transition further comprises:

generating an automated trajectory plan for moving the work implement to the travel position based on the obstacle state for each available range of movement.

5. The method of claim 4, wherein the second transition further comprises:

centering the work implement relative to the work machine by moving the work implement along the automated trajectory plan by controlling one or more actuators to adjust one or more hydraulic swing cylinders, hydraulic lift cylinders, hydraulic crowd cylinders, or hydraulic tilt cylinders.

6. The method of claim 1, wherein:

the plurality of stabilization points includes at least one work implement, a right-side stabilizer, and a left-side stabilizer.

7. The method of claim 6, further comprising:

in association with selectively enabling initiation of the desired work mode based on the determined relative evenness of the respective ground surface areas, lowering the plurality of stabilization points to create three points of contact with the respective ground surface areas.

8. The method of claim 1, wherein:

selectively enabling or preventing initiation of the desired work mode further comprises adjusting the position of at least one of the plurality of stabilization points to improve the stabilization of the work machine.

9. The method of claim 1, wherein:

the plurality of perception sensors includes at least one of LiDAR sensors, cameras, ultrasonic sensors, or structured light sensors.

10. The method of claim 1, wherein:

the fields of view of the plurality of perception sensors are dynamically adjusted based on detected changes in orientation and/or operating conditions of the work machine.

11. The method of claim 1, wherein:

preventing initiation or preventing movement includes overriding operator commands if the determined stability or obstacle state does not meet predefined safety thresholds.

12. A system for transitioning between a travel mode and a work mode for a work machine, the work machine comprising a frame, the work machine comprising:

a work implement controllably movable relative to the frame;

one or more stabilizers operable to selectively engage a ground surface;

a plurality of sensors configured to capture data from respective fields of view;

a storage medium configured to store predefined thresholds and trajectory data; and a controller operatively coupled to the plurality of sensors, the controller configured to:

fuse the captured data into a common reference frame to generate a surface profile of ground surface areas, and obstacle data within movement trajectories;

determine whether the surface profile meets a predefined stability threshold for the work mode;

determine safe movement trajectories for transitioning the work implement and stabilizers to predefined travel positions; and automatically control movement of the work implement and stabilizers to:

deploy and stabilize the machine for the work mode when the stability threshold is met; and retract the work implement and stabilizers to predefined travel positions for the travel mode along the determined safe trajectories.

13. The work machine of claim 12, wherein:

the fields of view include ground surface areas corresponding to stabilizer contact points and movement trajectories of the work implement and stabilizers.

14. The work machine of claim 12, wherein:

the stabilizers include at least one work implement, a right-side stabilizer, and a left-side stabilizer.

15. The work machine of claim 12, further comprising:

a user interface configured to receive input transition requests and provide notifications, wherein the notifications relate to stability conditions, obstacle presence, or transition status.

16. The work machine of claim 12, wherein:

the plurality of sensors comprises at least one LiDAR, cameras, ultrasonic sensors, or structure light sensors for detecting surface profiles and obstacles.

17. The work machine of claim 12, wherein:

the controller is further configured to execute obstacle avoidance maneuvers by adjusting the movement trajectory of the work implement based on real-time obstacle detection.

18. The work machine of claim 12, wherein:

the predefined travel positions for the work implement and stabilizers are adjustable based on operator preferences or site-specific conditions entered via the user interface.

19. The work machine of claim 12, wherein:

the plurality of sensors includes tilt sensors to measure pitch and roll of the work machine and provide input for stabilizing the work machine on uneven terrain.

20. The work machine of claim 12, further comprising:

a safety module configured to override operator commands if the controller determines a safety threshold is exceeding during transitioning between a travel mode and a work mode.

* * * * *